US008195108B2

(12) United States Patent
Sheynblat et al.

(10) Patent No.: US 8,195,108 B2
(45) Date of Patent: Jun. 5, 2012

(54) ALTITUDE-DEPENDENT POWER MANAGEMENT

(75) Inventors: Leonid Sheynblat, Hillsborough, CA (US); Cristina A. Seibert, Mountain View, CA (US)

(73) Assignee: Qualcomm Incorporated, San Diego, CA (US)

( * ) Notice: Subject to any disclaimer, the term of this patent is extended or adjusted under 35 U.S.C. 154(b) by 523 days.

(21) Appl. No.: 12/411,070

(22) Filed: Mar. 25, 2009

(65) Prior Publication Data

US 2010/0248662 A1 Sep. 30, 2010

(51) Int. Cl.
*H04B 1/04* (2006.01)
(52) U.S. Cl. ............... 455/127.1; 455/127.2; 455/127.3; 455/127.4; 455/127.5; 340/540; 370/311; 370/338; 370/328
(58) Field of Classification Search ................... 455/522, 455/67.11, 90.2, 73, 39, 456.3, 343.5; 340/540, 340/8.1, 7.37, 7.33; 370/311, 338, 328
See application file for complete search history.

(56) References Cited

U.S. PATENT DOCUMENTS

| 6,133,871 | A | * | 10/2000 | Krasner | 342/357.74 |
| 6,921,987 | B2 | * | 7/2005 | Marin-Martinod | 307/32 |
| 7,417,579 | B1 | * | 8/2008 | Woodell | 342/26 B |
| 7,852,583 | B2 | * | 12/2010 | Uji et al. | 360/31 |
| 8,014,329 | B2 | * | 9/2011 | Gong | 370/311 |
| 2006/0178108 | A1 | * | 8/2006 | Chotoku et al. | 455/26.1 |

FOREIGN PATENT DOCUMENTS

| DE | 102005060784 | 6/2007 |
| EP | 1708075 A2 | 10/2006 |
| EP | 1737193 | 12/2006 |
| EP | 1916854 A1 | 4/2008 |
| EP | 2117207 A2 | 11/2009 |
| WO | WO2009151753 | 12/2009 |

OTHER PUBLICATIONS

International Search Report and Written Opinion—PCT/US2010/028514, International Search Authority—European Patent Office—Jun. 7, 2010.

* cited by examiner

*Primary Examiner* — Lam T Mai

(57) ABSTRACT

The subject matter disclosed herein relates to changing at least one power state of a mobile station at least in part in response to information indicating a change in altitude from one or more sensors.

68 Claims, 9 Drawing Sheets

ALTITUDE-DEPENDENT POWER MANAGEMENT

BACKGROUND

1. Field

The subject matter disclosed herein relates to power management of a mobile station.

2. Information

Mobile stations such as, for example, cellular telephones, may provide voice communication through wireless communication with a network of terrestrial cell towers, sometimes referred to as base stations. As part of the voice communication process, cellular telephones continually detect pilot signals transmitted from a number of base stations and report detected signals and their associated signal strengths to a controlling base station. Handovers from one controlling base station to another may occur as the cellular telephone moves from one cell area to another in order to ensure uninterrupted conversation. Handover decisions may be made by the cellular network at least in part based on the reported signal strengths. The cellular telephone receives the pilot signals and reports signal strengths even when the phone is not engaged in a call.

Smart phones, as another example of a mobile station, may include enhanced functionality beyond voice communication. Features that may be included in a smart phone may include 3D graphics, music player, enterprise networking applications, camera, personal digital assistant functions, text messaging, email, and internet browser, to name a few example features. Mobile stations may further incorporate, in some cases, sensors. Such sensors may include accelerometers, barometers, and gyroscopes, to name a few examples. Sensors such as those listed may be based on microelectromechanical systems (MEMS) technology, for example.

Mobile stations may also provide navigation functions. Satellite positioning systems (SPS) such as, for example, the Global Positioning System (GPS), may provide navigation information to mobile stations in many circumstances. To gather information in order to determine a position location, a mobile station may receive timing signals from an SPS. Such information may be utilized by the mobile station to estimate the position location, or the mobile station may provide the information to a network entity, perhaps accessed via a cellular network for one example, for position location estimation. Navigation operations may also be based, at least in part, on signals received from cellular base stations and/or on information generated by one or more MEMS sensors, in some mobile stations.

The various features mentioned above for mobile stations may result in a relatively high rate of power consumption. Further, mobile stations may on occasion be utilized under conditions that may result in relatively burdensome power consumption. For example, a mobile station carried onto an airplane and traveling at several hundred miles per hour relative to the ground may experience difficulties in acquiring and maintaining communication with base stations on the ground, and may also experience difficulty in performing position location operations. For merely one example of a burdensome power consumption scenario, consider that a mobile station traveling in an airplane may continually attempt to acquire terrestrial base stations in order to establish communications. Such repeated attempts to acquire a base station may result in relatively high power consumption that may drain the mobile station's battery relatively quickly. Similarly, performing position location operations that may result in inaccurate location information due to the high rate of speed may waste power.

Also, due in part to the mobile station's continual transmission of signals even if not engaged in a call, users traveling by air are required to shutdown the mobile station during flight in order to conform with Federal Aviation Administration (FAA) regulations against signal transmission from electronic devices carried by passengers during flight. If the user forgets to power down the mobile station when preparing for take off, the relatively high rates of power consumption may significantly or completely drain the mobile station's battery by the time the user arrives at the destination. Further, failure by the user to power down the mobile station will result in a violation of FAA regulations that are intended to make air travel more safe.

SUMMARY

In one aspect, a change in altitude of a mobile station may be detected based, at least in part, on information provided by one or more sensors in the mobile station. At least one power state of the mobile station may be changed at least in part in response to the detection of the change in altitude. It should be understood, however, that this is merely an example implementation and that other implementations may be used without deviating from claimed subject matter.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
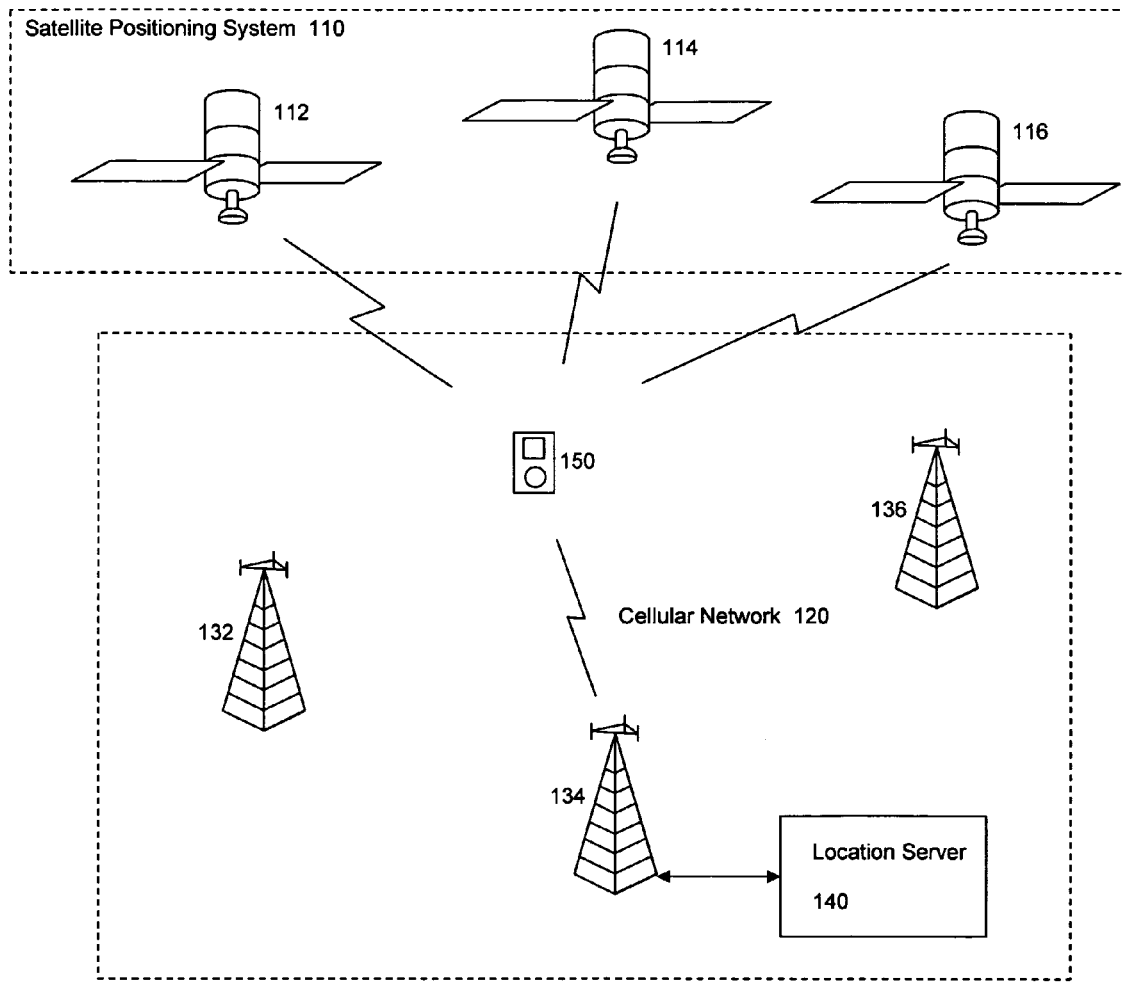
FIG. 1 is a block diagram of an example satellite position system (SPS) and an example cellular network.

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

As previously mentioned, mobile stations may on occasion be utilized under conditions that may result in relatively high power consumption and/or in relatively poor performance. For example, a mobile station carried onto an airplane and traveling at several hundred miles per hour may consume relatively high amounts of power due to repeated attempts to acquire terrestrial base stations, and may also experience difficulty and expend energy in performing position location operations that may result in faulty location information.

In one aspect, a mobile station may detect a change in altitude, and may change at least one power state of the mobile station at least in part in response to the detection of the change in altitude. For example, a mobile station carried onto an airplane may automatically detect a take-off and/or ascent of the airplane, and the mobile station may change one or more power states of the mobile station at least in part in response to the detection of the take-off and/or ascent.

Mobile stations may, in at least some cases, incorporate one or more sensors for any of a number of functions. These sensors may convert physical phenomena into analog and/or electrical signals. As mentioned previously, such sensors may be based on MEMS technologies, for some example implementations. Such sensors may include, for example, an accelerometer. Such an accelerometer may sense the direction of gravity and any other force acting on the sensor. The accelerometer may be used to sense linear and/or angular movement, and may also be used, for example, to measure tilt and/or roll. Another sensor type may include a barometric pressure sensor (barometer). A barometric pressure sensor may be used to measure atmospheric pressure. Applications for the barometric pressure sensor may include determining altitude. Other applications may include observing atmospheric pressure as it relates to weather conditions.

As mentioned above, a mobile station may detect a change in altitude, and may, at least in part in response to detecting the change in altitude, change at least one power state. In one aspect, the detection of the change in altitude may be based on information from one or more sensors in the mobile station. Examples of how sensors may be used to detect changes in altitude and examples of changes to various example power states are provided below. However, the scope of claimed subject matter is not limited to the specific examples described herein.

FIG. 1 is a diagram depicting an example cellular network 120 and an example satellite positioning system (SPS) 110. In an aspect, SPS 110 may comprise a number of space vehicles (SV), for example SVs 112, 114, and 116. For an example, SPS 110 may comprise any of several Global Navigation Satellite Systems (GNSS) such as GPS, Glonass, Galileo, regional satellite systems, etc., although the scope of claimed subject matter is not limited in this respect. For one example, cellular network 120 may comprise base stations 132, 134, and 136. Of course, other examples may include other numbers of base stations, and the configuration of base stations depicted in FIG. 1 is merely an example configuration. Further, as used herein, the term "base station" is meant to include any wireless communication station and/or device typically installed at a known location and used to facilitate communication in a wireless network, such as, for example, a cellular network. In another aspect, base stations may be included in any of a range of electronic device types. Also, although some example embodiments described herein mention communication transceivers and various networks, some embodiments may comprise mobile stations or other electronic device types that do not need to be connected to any network or other device in order to perform the altitude change detection and power management operations described herein.

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform specially programmed to perform specific functions by machine-readable instructions.

In one or more aspects, mobile station 150 may communicate with one or more of SVs 112, 114, and 116, as well as with base station 134. For example, mobile station 150 may receive signal propagation delay information from one or more of the SVs and/or the base station.

In another aspect, position location determination calculations may be performed by a location server 140 such as, for example, a position determination entity, depicted in FIG. 1, rather than at mobile station 150. Such a calculation may be based, at least in part, on information gathered by mobile station 150 from one or more of SVs 112, 114, and 116, as well as information related to one or more sensors for mobile station 150, for an example. In a further aspect, location server 140 may transmit the calculated position location to mobile station 150.

As noted previously, in situations where a mobile station such as mobile station 150 is traveling at a high rate of speed and/or where the mobile station is located at relatively high altitudes, such as in an airplane, the mobile station may have difficulty communicating with any of base stations 132, 134, and 136. The higher rates of speed and/or the relatively high altitude of mobile station 150 may also make it difficult for the mobile station to perform or participate in position location operations. Additionally, a mobile station attempting to acquire one or more base stations may consume relatively large amounts of power, as mentioned above. In order to reduce power consumption, for one example, mobile station 150 may detect that a specified threshold altitude has been reached, and at least in part in response to that detection, the mobile station may adjust its functionality in some manner to reduce power consumption. In an aspect, mobile station 150 may cease seeking to acquire terrestrial base stations in response to the detection that the altitude threshold has been exceeded. However, these are merely examples of actions that may be taken in response to a specified circumstance related to altitude, and the scope of claimed subject matter is not limited in these respects.

As used herein, the term "altitude" is intended to denote a vertical distance between one point of reference and another. As used herein, the "vertical" direction denotes the direction of gravity. For one example, the term "altitude" may denote a vertical distance between an object and a ground level. For another example, the term "altitude" may denote a vertical distance between an object and sea level. For example, if an airplane takes off from a runway situated at 200 ft. above sea level, and if the airplane climbs to an altitude of 20,000 ft, the airplane may be said to have undergone a change in altitude of 19,800 ft. However, these are merely example usages of the term "altitude", and the scope of claimed subject matter is not limited in these respects.

Also, as used herein, the term "acceleration" may refer to positive acceleration, and may also refer to negative acceleration, which may sometimes be referred to a deceleration. Further, it should be noted that calculating vertical distances may involve time measurements as well as accelerations. Given the vertical acceleration (or deceleration) and the amount of time transpired, a change in vertical distance, or in other words a change in altitude, may be calculated. Also, for one or more examples, "acceleration" may refer to linear acceleration, although other examples may make use of angular acceleration without deviating from the scope of claimed subject matter.

Figure 2:
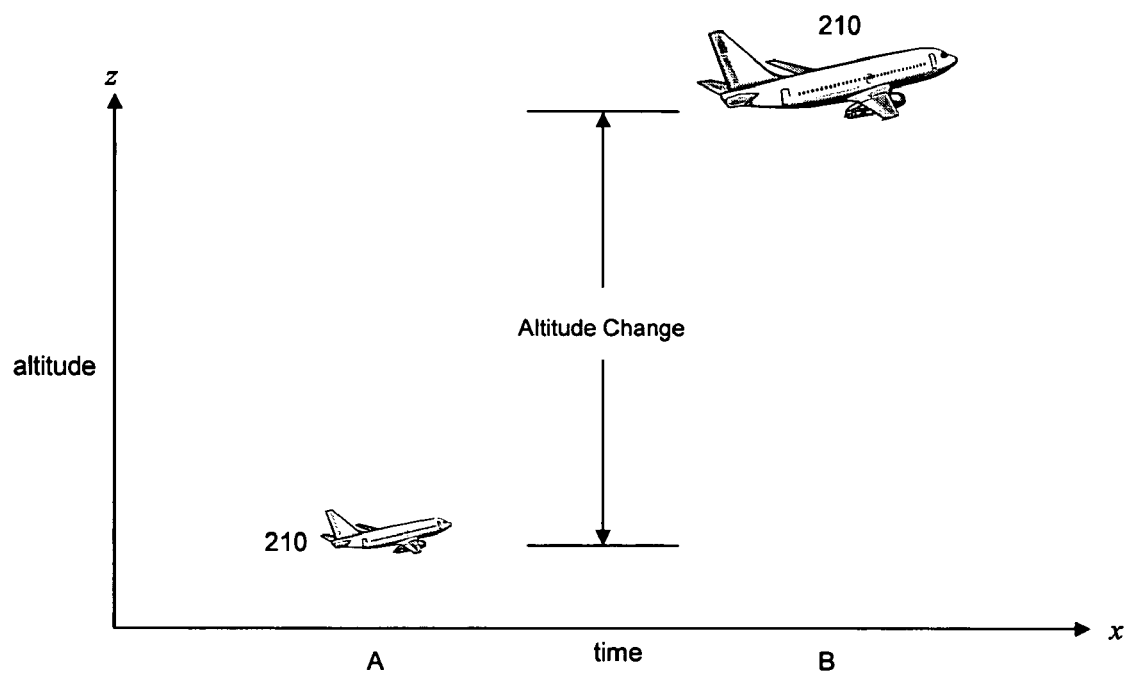
FIG. 2 is an illustration depicting an altitude change over time of an airplane.

FIG. 2 is an illustration depicting an altitude change over time (from instance 'A' to instance 'B') of an airplane 210. For the example depicted in FIG. 2, airplane 210 may lift-off at some point in time before time A. Airplane 210 may be at a first altitude at time 'A', and may be at a higher altitude at a later point in time 'B'. A mobile station on airplane 210 may detect the change in altitude experienced by the mobile station between points of time 'A' and 'B', and may change one or more power states in response to detecting the change in altitude. The mobile station may recognize the relatively large change in altitude in one aspect, and/or may recognize an elevated level of vertical acceleration over a period of time between points in time 'A' and 'B' in another aspect, and may base changes in one or more power states on the recognition of those example conditions.

To continue the present example, a mobile station may incorporate an accelerometer and a timer. The accelerometer may provide a signal indicating a level of acceleration, and if at least a specified level of acceleration is experienced over at least a specified period of time, one or more power states may be changed. As mentioned previously, changing one or more power states may comprise ceasing position location operations and/or ceasing to seek to communicate with terrestrial towers (base stations), although the scope of claimed subject matter is not limited to these particular examples.

Figure 3:
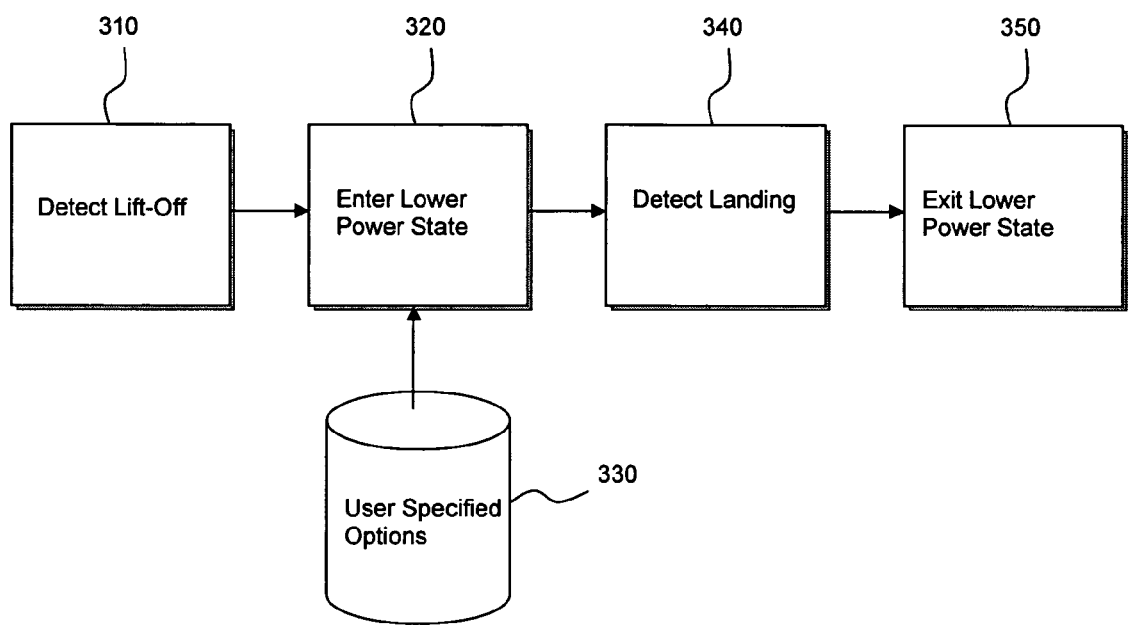
FIG. 3 is a flow diagram of an example of a method for managing power consumption in a mobile station.

FIG. 3 is a flow diagram of an example of a method for managing power consumption in a mobile station. For this particular example, a mobile station may be situated on an airplane, perhaps carried on by a passenger or crew member. At block 310, the mobile station may detect that the airplane has lifted off. In one aspect, the lift-off may comprise a relatively short period of time during which the airplane accelerates from a low speed on the ground to a much greater speed in the air, leaving the ground. In another aspect, the lift-off period to be detected may comprise a larger period of time, perhaps on the order of tens of minutes, during which the airplane climbs from the ground level to a cruising altitude. In such a situation, the mobile station may measure a level of acceleration that may exceed a threshold value over a specified period of time. If the level of acceleration exceeds the threshold level for the specified period of time, a lift-off condition may be detected. Alternatively, in another example aspect, the mobile station may detect a change in atmospheric pressure that may change by more than a threshold amount within a specified period of time, and the lift-off condition may be detected.

In one aspect, because airplane cabins are typically pressurized, the conditions for detecting a change in altitude using a barometric pressure sensor may differ from the conditions that would exist outside of a pressurized cabin. For example, accurate altitude measurements may not be possible using a barometer inside of the pressurized cabin. However, airplane cabins may be pressurized within typical parameters. In an aspect, airplane cabins may be expected to be pressurized to an equivalent "cabin altitude" within a range of 6,000-8,000 ft., for example. That is, the cabin may be pressurized to an atmospheric pressure that may be approximately equal to an atmospheric pressure existing at an altitude ranging from 6,000-8,000 ft. In an aspect, the mobile station may detect a take-off of an airplane by detecting a ramping of cabin pressure from the pressure existing on the ground prior to take-off to a pressure in the range of 6,000-8,000 ft, for one example. Of course, the specific atmospheric pressure values mentioned herein are merely examples, and the scope of claimed subject matter is not limited in these respects.

At least in part in response to detecting the lift-off of the airplane, a lower power state may be entered at block 320. The lower power state may comprise any state of the mobile station that may have a tendency to reduce power consumption. In an aspect, the lower power state may include turning off or reducing the power consumption of functional units that may not be useful in the environment of an airplane at altitude. For example, functional units that enable communications with terrestrial base stations may be turned off, at least in part, if a take-off is detected. Such functional units may include, for example, modems and searcher units that detect base stations. Functional units that enable position location operations may also be turned off or placed in a reduced power state, in an aspect. As used herein, the term "searcher unit" is meant to include any functional units in a mobile station that may be utilized in operations to seek for base stations with which the mobile station may establish wireless communications. Also as used herein, the term "modem" is meant to include any functional units used to proved wireless communications with a base station.

As used herein, the terms "low-power state" and "reduced-power state" are meant to include any state of any one or more functional units of a mobile station that enables the mobile station to consume less power than if in a full-power state. Power consumption may be reduced in one or more functional units by way of any of a number of techniques, including, but not limited to, reducing operating clock frequency, blocking a clock signal from reaching the one or more functional units, reducing a power supply voltage, etc. The low-power state may also comprise, for example, reducing the frequency of occurrence of one or more functions and/or operations. For example, in one aspect, a reduced-power state may include reducing how often the mobile station seeks to acquire a base station, or may also comprise reducing how often the mobile station performs position location operations.

In a further aspect, as indicated at block 330, a user may specify one or more options related to the lower power state entered into at block 320. For example, one or more aspects of actions to be taken in response to a detection of a take-off may be configurable by way of a menu of choices on the mobile station available to the user, allowing the user to customize mobile station behavior in the event of a detected airplane take-off. In an aspect, the user may specify which functions to modify or to cease performing. The user, for example, may specify that position location operations be ceased, and may also specify that the mobile station not transmit signals in an attempt to acquire base stations, and may further specify that the mobile station enable applications that do not require transmission of signals or position location information, such as, for a couple of examples, games and video/audio playback. Of course, these are merely examples of parameters that may be specified by the user, and the scope of claimed subject matter is not limited in these respects.

In another aspect, the change in power state may comprise configuring the mobile station to comply with Federal Aviation Administration (FAA) regulations related to electronic devices during flight. For example, the mobile station may, at least in part in response to the detection of the take-off of the airplane, configure itself to comply with FAA regulations. In one aspect, the mobile station may be configured to shut itself down during the first fifteen minutes of flight, and may at that point automatically power-up at least some functional units of the mobile stations without enabling transmission of signals from the mobile station during flight. Of course, these are merely examples of how a mobile station may be configured in response to a detection of a take-off, and the scope of claimed subject matter is not limited in these respects.

At block 340, the mobile station may detect a landing or descent of the airplane. During the descent of the airplane, the mobile station will experience a significant reduction in altitude over a period of time that may be detected by the one or more sensors incorporated into the mobile station. At least in part in response to the detected landing, the mobile station may exit the lower power state, and indicated for this example at block 350. For example, communication with terrestrial base stations may become enabled, and position location operations may also be enabled. Thus, in one aspect, the mobile station may detect take-offs and landings using one or more sensors incorporated into the mobile station, and one or more power states may be changed at least in part in response to the detected take-offs and landings. The aircraft take-offs and landings described herein are merely examples of changes in altitude that may be detected by a mobile station, and the scope of claimed subject matter is not limited in these respects. Other example processes in accordance with claimed subject matter may include all, less than, or more than blocks 310-350. Further, the order of blocks 310-350 is merely an example order, and the scope of claimed subject matter is not limited in this respect.

Example implementations described herein may make it easier for users to travel, in that FAA regulations may be automatically complied with, as described above, and battery consumption during flight may be significantly reduced. Of course, these are merely some possible advantages of example implementations described herein, and the scope of claimed subject matter is not limited in these respects. Further, although example mobile stations described herein comprise cellular telephones, example techniques for automatically conserving power during flight may also be utilized in other types of mobile stations. For merely one example in accordance with claimed subject matter, a tracking device may be shipped via air, and the tracking device may use example techniques described herein to automatically configure itself to conserve power during flight.

Figure 4:
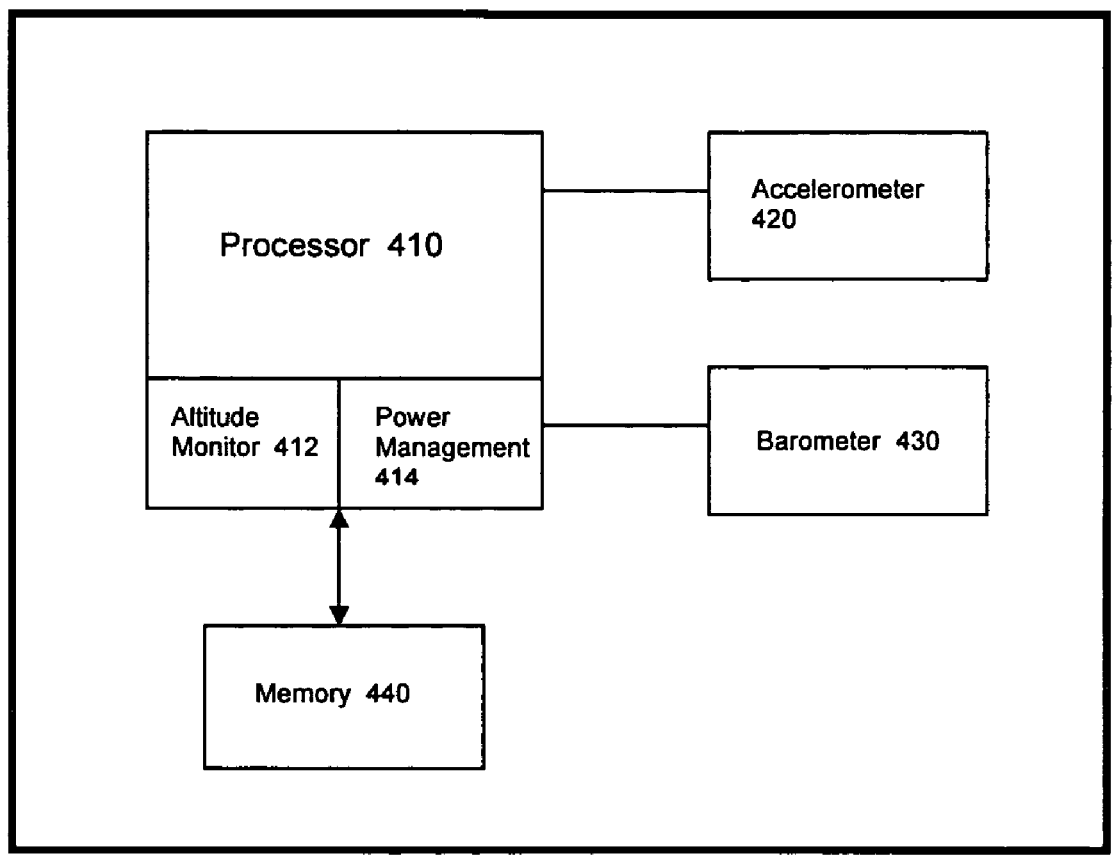
FIG. 4 is a diagram illustrating an example inertial measurement unit including sensors and power management functionality.

FIG. 4 is a block diagram of an example inertial measurement unit (IMU) 400. As used herein, the term "inertial measurement unit" is meant to include any electronic component or circuit that includes one or more sensor. IMUs may be incorporated in a range of electronic devices including, for example, mobile stations. However, the scope of claimed subject matter is not limited to mobile stations that incorporate an IMU. However, in one example, the one or more sensors used to detect altitude changes in a mobile station may comprise part of an IMU. IMU 400 for this example comprises a sensor 420 and a sensor 430, as well as a processor 410 and a memory 440. For the present example, processor 410 may be dedicated to operations directly related to sensors 420 and 430, although the scope of claimed subject matter is not limited in this respect.

Sensors 420 and 430 may comprise any of a range of sensor types. A variety of sensors may be available to support a number of applications. These sensors may generate analog and/or digital electrical signals in response to physical stimulus. Such sensors may include, for example, an accelerometer. For the present example, sensor 420 comprises an accelerometer. Accelerometer 420 may sense the direction of gravity and any other force experienced by the sensor. Accelerometer 420 may be used to sense linear and/or angular movement, and may also be used, for example, to measure tilt and/or roll. Yet another sensor type may include a gyroscope which measures the Coriolis effect and may be used in applications measuring heading changes or in measuring rate of rotation.

Another sensor type may include a barometric pressure sensor. Sensor 430 for the present example comprises a barometric pressure sensor, or barometer. Barometer 430 may be used to measure atmospheric pressure. Applications for the barometric pressure sensor may include detecting an airplane take-off, as described previously. Other applications may include observing atmospheric pressure as it relates to weather conditions.

Another type of sensor may include a magnetic field sensor that may measure the strength of a magnetic field and, correspondingly, the direction of a magnetic field. A compass is an example of a magnetic field sensor. The compass may find use in determining absolute heading in car and pedestrian navigation applications.

Although the example of FIG. 4 depicts sensors 420 and 430 as being included with processor 410 in a discrete, separately packaged IMU 400, the scope of claimed subject matter is not limited in this respect, and other examples are possible using discrete sensors that are not packaged in an IMU.

In another aspect, IMU 400 may comprise an altitude monitor 412 and a power management unit 414. For one example, altitude monitor 412 may use information from accelerometer 420 and/or barometer 430 to detect changes in altitude and/or to detect aircraft take-offs and/or landings. Power management unit 414 may direct other functional units to enter and exit lower power states, some examples of which are described above. Altitude monitor 412 and power management unit 414 may be implemented as separate functional units, or in some examples may be implemented as part of processor 410. In some examples, altitude monitor and/or power management unit 414 may be implemented as instructions stored in memory 440 executed by processor 410, although the scope of claimed subject matter is not limited in this respect. Although processor 410, altitude monitor 412, power management unit 414, sensors 420 and 430, and memory 440 are depicted and described as being incorporated into an IMU, the scope of claimed subject matter is not limited in this respect.

Figure 5:
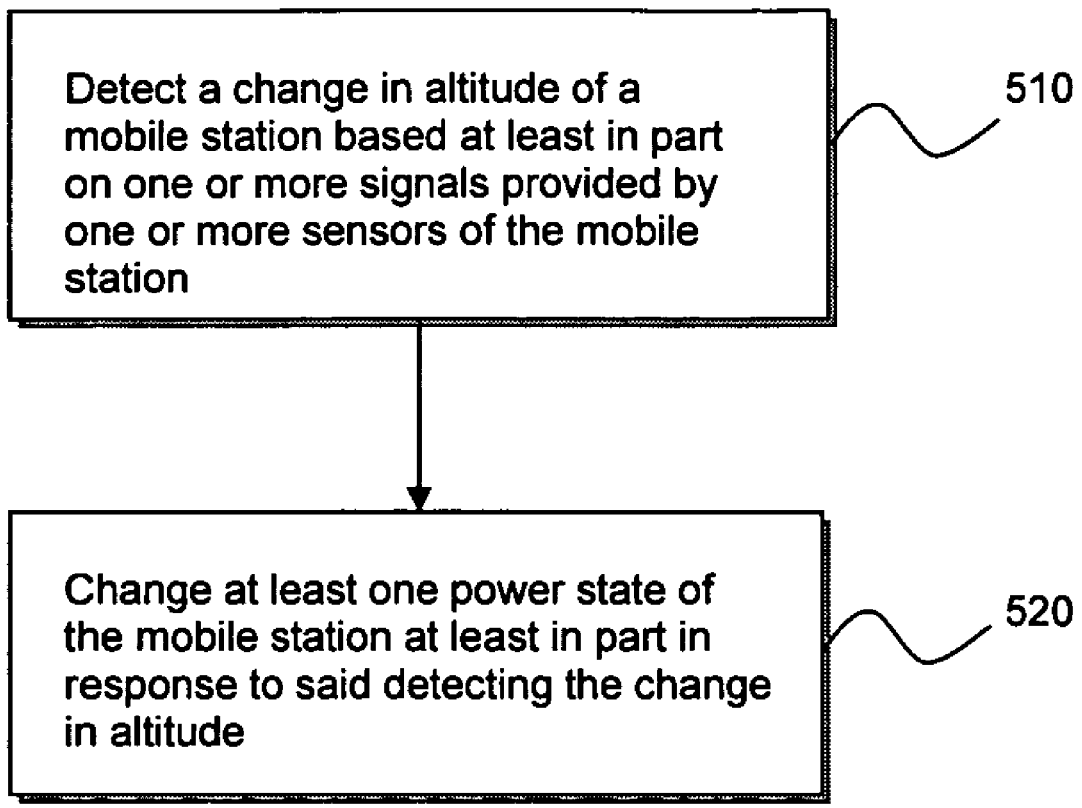
FIG. 5 is a flow diagram of an example process for changing a power state of a mobile station at least in part in response to a detection of a change in altitude of the mobile station.

FIG. 5 is a flow diagram of an example process for power managing a mobile station based at least in part on changes in altitude. At block 510, a change in altitude may be detected based, at least in part, on one or more signals provided by one or more sensors of the mobile station. At block 520, at least one power state of the mobile station may be changed at least in part in response to the detection of the change in altitude. Other example processes in accordance with claimed subject matter may include all, less than, or more than blocks 510-520. Further, the order of blocks 510-520 is merely an example order, and the scope of claimed subject matter is not limited in this respect.

Figure 6:
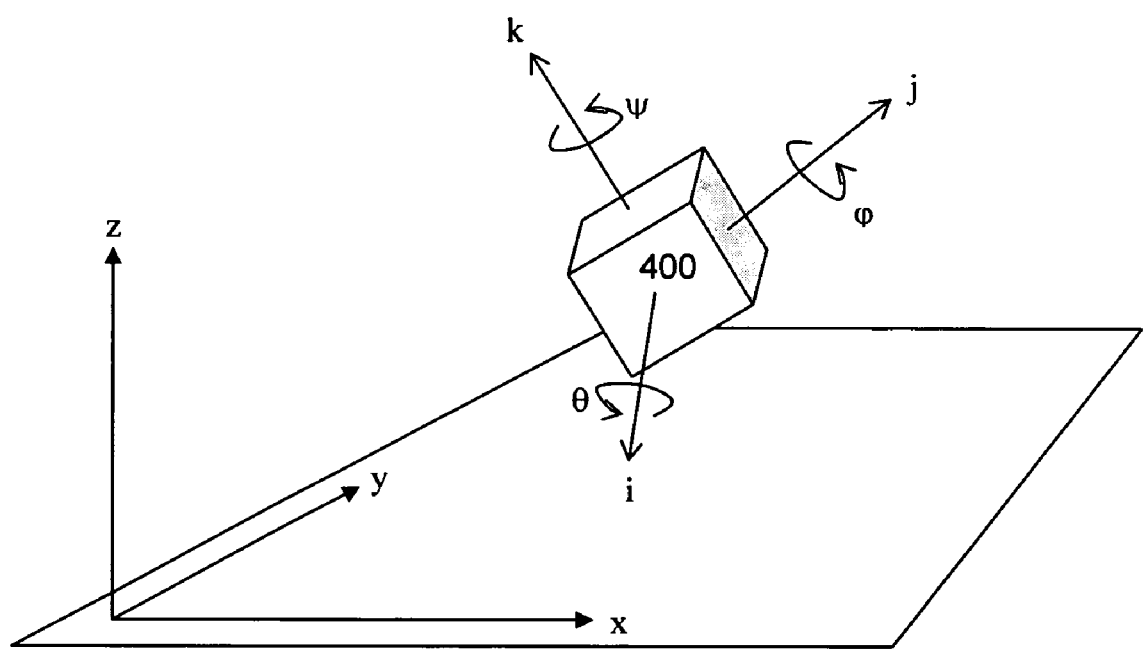
FIG. 6 is a diagram illustrating an example inertial measurement unit having a plurality of degrees of freedom.

FIG. 6 is a diagram illustrating example IMU 400 with a plurality of degrees of freedom. In navigation applications, accelerometers, gyroscopes, geomagnetic sensors, and pressure sensors may be utilized to provide various degrees of observability. In an aspect, and as described above, IMU 400 may comprise at least one accelerometer and at least one barometer, although the scope of claimed subject matter is not limited in this respect. For one example, IMU 400 may further comprise a gyroscope, and as depicted in FIG. 6, the accelerometer and gyroscope may provide six axes of observability (i, j, k, θ, φ, ψ). The accelerometer may sense linear motion (translation in any plane, such as a local vertical plane). This translation may be measured with reference to at least one axis. The accelerometer may also provide a measure of an object's tilt (roll or pitch). Thus, with the accelerometer, an object's motion in Cartesian coordinate space (i, j, k) may be sensed, and the direction of gravity may be sensed to estimate an object's roll and pitch. Thus, the accelerometer may be used to detect acceleration in the vertical direction, such as in detecting changes in altitude. The gyroscope may be used to measure the rate of rotation about (i, j, k), i.e., roll (θ) and pitch (φ) and yaw, which may also be referred to as azimuth or "heading" (ψ). Of course, IMU 400 merely represents on example, and the various degrees of observability are also merely examples. The scope of claimed subject matter is not limited to these specific examples.

Figure 7:
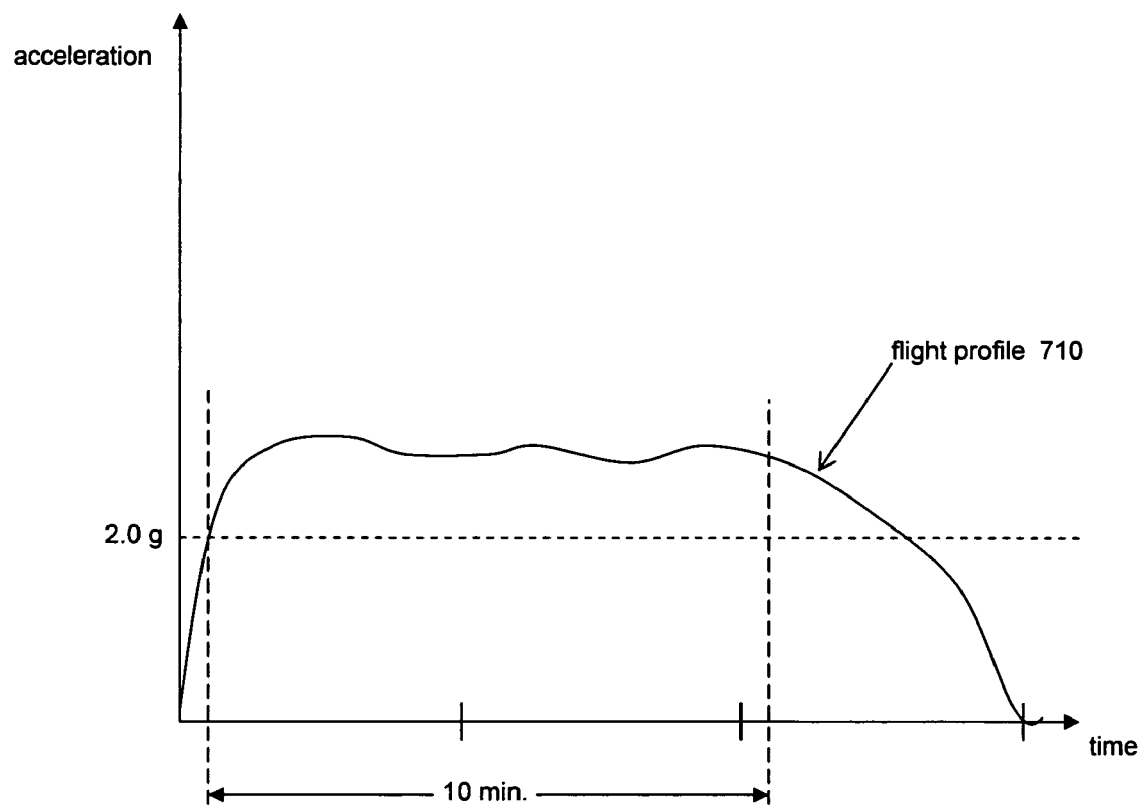
FIG. 7 is an illustration depicting an elevated acceleration level over a period of time for an airplane.

FIG. 7 is an illustration depicting an elevated acceleration level over a period of time for an airplane. For the example of FIG. 7, the 'y' axis represents acceleration, and the 'x' axis represents time. A flight profile 710 is depicted as acceleration values over time for an airplane, in this example. Of course, profile 710 is merely an example, and may differ from what may be experienced by an actual aircraft. Profile 710 is presented merely as an example. A mobile station carried aboard an aircraft may experience a rise in acceleration at take-off. As the aircraft climbs to its cruising altitude, the mobile station may experience gravitation forces of more than 2.0 g, for the present example. For the present example, 2.0 g is selected as a threshold level of acceleration. If the mobile station exceeds this level of acceleration for a specified period of time, the mobile station may enter one or more lower power states, describe previously. For this example, the period of time is specified as ten minutes, although the scope of claimed subject matter is not limited in this respect. As the aircraft approaches its cruising altitude and levels off, the mobile station may experience little acceleration, as shown in the example of FIG. 7 at the fifteen minute mark. As described previously, an accelerometer may be utilized to measure acceleration. Also, as discussed previously, in addition to measuring acceleration during an aircraft's ascent, a mobile station may also measure acceleration during the aircraft's descent, and may enable changes in one or more power states in response to the detected change in altitude during the descent.

Figure 8:
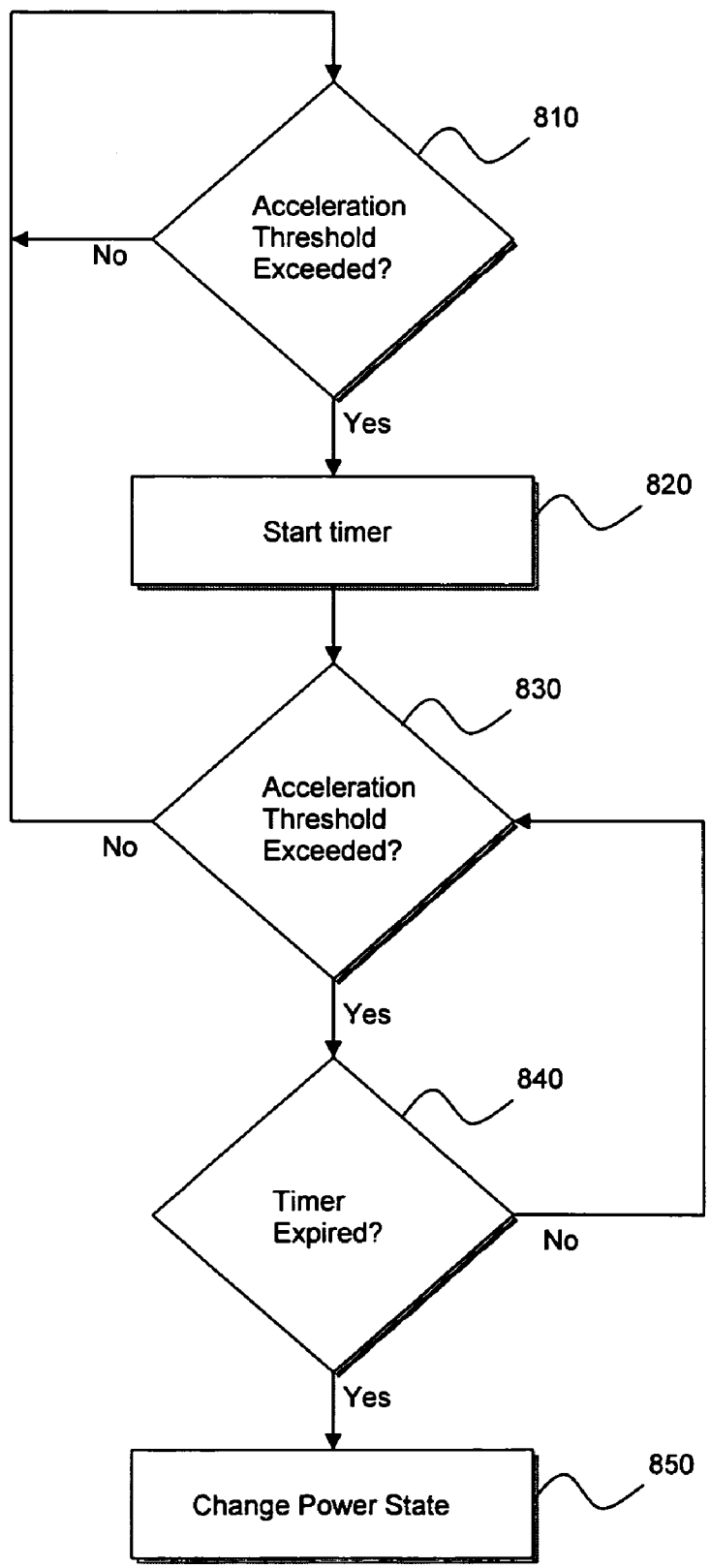
FIG. 8 is a flow diagram of an example of a method for managing power consumption in a mobile station.

FIG. 8 is a flow diagram of an example of a method for managing power consumption in a mobile station. At block 810, a determination may be made as to whether a threshold value of acceleration has been exceeded. The scope of claimed subject matter is not limited to any particular acceleration threshold value. Further, in an aspect, the threshold value may be specified by the mobile station manufacturer, or may be a value that may be specified by a user, for example. However, again, the scope of claimed subject matter is not limited in this respect.

At least in part in response to a detection that the acceleration threshold has been exceeded, a timer of the mobile station may be started at block 820. For an example, the timer may be set for a period of time specified by the manufacturer, or the timer value may be specified by the user, although the scope of claimed subject matter is not limited in this respect. At least in part in response to the start of the timer, a further determination may be made at block 830 as to whether the acceleration threshold continues to be exceeded. If the threshold is still exceeded, a determination may be made at block 840 to determine whether the timer has expired. If, at block 830 it is determined that the acceleration threshold is not exceeded, the process restarts at block 810.

As mentioned, at block 840, a determination may be made as to whether the timer has expired. If the timer has not yet expired, an additional determination may be made as to whether the acceleration threshold continues to be exceeded. As long as the acceleration threshold is exceeded, and as long as the timer does not expire, the process may cycle through blocks 830 and 840. If at block 840 the time has expired with the acceleration threshold still exceeded, at least one power state may be changed at block 850. In this manner, if the detected acceleration exceeds threshold level for at least the specified period of time, a change in at least one power state will be enabled. Other example processes in accordance with claimed subject matter may include all, less than, or more than blocks 810-850. Further, the order of blocks 810-850 is merely an example order, and the scope of claimed subject matter is not limited in this respect.

As previously mentioned, a mobile station may comprise one or more sensors that may provide data that may be used to detect airplane takeoff and/or landing events. Possible types of sensors may include accelerometers, gyroscopes, and barometers, to name a few examples. In one aspect, the mobile station may perform spectral frequency analysis of accelerometer data to detect takeoff and/or landing events. For example, the spectral frequency analysis may reveal low frequency high acceleration peaks that may indicate airplane travel.

In another aspect, sensor data from one or more of an accelerometer, a gyroscope, and/or a barometer may be analyzed and patterns of sensor data may be compared with patterns stored in an a priori database of takeoff/landing patterns. Takeoff and landing events may be detected by matching a pattern gathered from sensor data with the patterns stored in the database. A pattern match may indicate a positive detection of an airplane takeoff or landing event.

As used herein, the term "a priori" is meant to indicate something that is formed or conceived beforehand. Therefore, an a priori database is one that is formed beforehand. For the present example, the a priori database may have stored therein patterns that may have been researched and/or tested and that are believed and/or known to indicate airplane landing and/or takeoff events. The database may be stored locally within the mobile station, and the database further may be stored in a non-volatile memory device.

Figure 9:
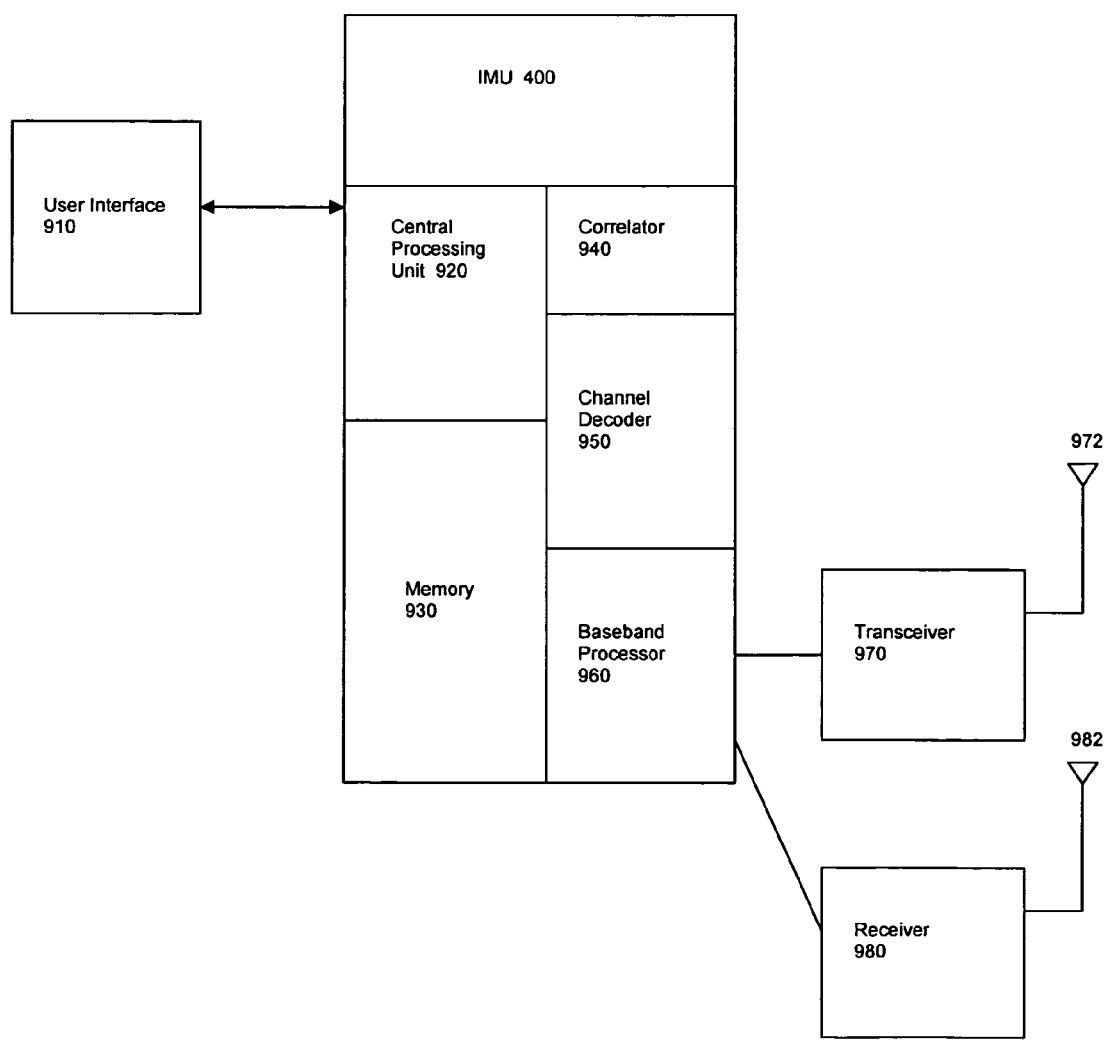
FIG. 9 is a block diagram of an example mobile station incorporating one or more sensors.

FIG. 9 is a block diagram of an example of mobile station 150. One or more radio transceivers 970 may be adapted to modulate an RF carrier signal with baseband information, such as voice or data, onto an RF carrier, and demodulate a modulated RF carrier to obtain such baseband information. An antenna 972 may be adapted to transmit a modulated RF carrier over a wireless communications link and receive a modulated RF carrier over a wireless communications link.

A baseband processor 960 may be adapted to provide baseband information from a central processing unit (CPU) 920 to transceiver 970 for transmission over a wireless communications link. Here, CPU 920 may obtain such baseband information from an input device within a user interface 910. Baseband processor 960 may also be adapted to provide baseband information from transceiver 970 to CPU 920 for transmission through an output device within user interface 910. Transceiver 970 may comprise at least part of a searcher unit that may be involved in searching for base stations in order to establish wireless communications. As described previously, any functional unit that may be involved in searching for base stations may be considered to be at least part of a searcher unit.

User interface 910 may comprise a plurality of devices for inputting or outputting user information such as voice or data. Such devices may include, by way of non-limiting examples, a keyboard, a display screen, a microphone, and a speaker.

A receiver 980 may be adapted to receive and demodulate transmissions from an SPS, and provide demodulated information to correlator 940. Correlator 940 may be adapted to derive correlation functions from the information provided by receiver 980. Correlator 940 may also be adapted to derive pilot-related correlation functions from information relating to pilot signals provided by transceiver 970. This information may be used by a mobile station to acquire wireless communications services. Channel decoder 950 may be adapted to decode channel symbols received from baseband processor 960 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 950 may comprise a turbo decoder.

A memory 930 may be adapted to store machine-readable instructions which are executable to perform one or more of processes, implementations, or examples thereof which are described or suggested herein. CPU 920 may be adapted to access and execute such machine-readable instructions.

Mobile station 150 for this example comprises an IMU 400, which may be adapted to perform any, all, or none of the sensor measurement operations described herein, including, for example, acceleration detection operations and/or change in altitude determinations. Further, mobile station 150 may comprise a timer that may reside in IMU 400 for an example, or in any other functional unit.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
    detecting a change in altitude of a mobile station based, at least in part, on detecting that an amount of change from one or more signals provided by one or more sensors of the mobile station exceeds a specified threshold; and
    changing at least one power state of the mobile station at least in part in response to said detecting the change in altitude.

2. The method of claim 1, wherein said detecting that the amount of change exceeds the specified threshold comprises detecting a level of change of acceleration exceeding the specified threshold.

3. The method of claim 1, wherein said detecting the amount of change exceeds the specified threshold comprises detecting a level of change of acceleration exceeding the specified threshold over a specified period of time.

4. The method of claim 1, wherein said detecting that the amount of change exceeds the specified threshold comprises detecting a change in atmospheric pressure exceeding the specified threshold.

5. The method of claim 1, wherein said changing said at least one power state comprises directing a position estimation unit to cease position location operations.

6. The method of claim 1, wherein said changing said at least one power state comprises directing a modem of the mobile station to enter a low-power state.

7. The method of claim 1, wherein said changing at least one power state comprises directing the mobile station to enter an airplane mode of communication.

8. The method of claim 1, further comprising detecting an ascent of an airplane based, at least in part, on said detecting the change in altitude.

9. The method of claim 1, further comprising detecting a decent of an airplane based at least in part on said detecting the change in altitude.

10. A method, comprising:
    detecting a change in altitude of a mobile station based, at least in part, on one or more signals provided by one or more sensors of the mobile station;
    changing at least one power state of the mobile station at least in part in response to said detecting the change in altitude; and
    detecting an ascent of an airplane based, at least in part, on said detecting the change in altitude, wherein said changing said at least one power state comprises directing a searcher unit of the mobile station to cease searching for terrestrial base stations.

11. The method of claim 10, further comprising enabling a modem to communicate with an air interface provided by the airplane at least in part in response to a detection of the ascent of the airplane.

12. A method, comprising:
    detecting a change in altitude of a mobile station based, at least in part, on one or more signals provided by one or more sensors of the mobile station;
    changing at least one power state of the mobile station at least in part in response to said detecting the change in altitude; and
    detecting a decent of an airplane based at least in part on said detecting the change in altitude, wherein said changing said at least one power state comprises directing a searcher unit of the mobile station to recommence searching for terrestrial base stations at least in part in response to said detecting the decent of the airplane.

13. The method of claim 12, wherein said changing at least one power state comprises directing the mobile station to recommence an online communicate mode.

14. A mobile station, comprising:
    one or more sensors;
    an altitude monitor unit to detect a change in altitude of the mobile station based, at least in part, on that an amount of change from one or more signals provided by the one or more sensors exceeds a specified threshold; and
    a power management unit to change at least one power state of the mobile station at least in part in response to said detecting the change in altitude.

15. The mobile station of claim 14, said altitude monitor unit to detect the change in altitude by detecting a level of change of acceleration exceeding the specified threshold.

16. The mobile station of claim 14, said altitude monitor unit to detect the change in altitude by detecting a level of change of acceleration exceeding the specified threshold over a specified period of time.

17. The mobile station of claim 14, said altitude monitor unit to detect the change in altitude by detecting an amount of change in atmospheric pressure exceeding the specified threshold.

18. The mobile station of claim 14, said power management unit to change said at least one power state by directing a position estimation unit to cease position location operations.

19. The mobile station of claim 14, further comprising a modem, said power management unit to change said at least one power state by directing the modem to enter a low-power state.

20. The mobile station of claim 14, wherein said changing at least one power state comprises directing the mobile station to enter an airplane mode of communication.

21. The mobile station of claim 14, said altitude monitor unit to detect an ascent of an airplane based, at least in part, on said detecting the change in altitude.

22. The mobile station of claim 14, the altitude monitor unit further to detect a decent of an airplane based at least in part on said detecting the change in altitude.

23. A mobile station, comprising:
    one or more sensors;
    an altitude monitor unit to detect a change in altitude of the mobile station based, at least in part, on one or more signals provided by the one or more sensors;
    a power management unit to change at least one power state of the mobile station at least in part in response to said detecting the change in altitude
    said altitude monitor unit to detect an ascent of an airplane based, at least in part, on said detecting the change in altitude; and
    a searcher unit, said power management unit to change said at least one power state by directing the searcher unit to cease searching for terrestrial base stations.

24. The mobile station of claim 23, further comprising a modem to communicate with an air interface provided by the airplane at least in part in response to the detection of the ascent of the airplane.

25. A mobile station, comprising:
    one or more sensors;

an altitude monitor unit to detect a change in altitude of the mobile station based, at least in part, on one or more signals provided by the one or more sensors;

a power management unit to change at least one power state of the mobile station at least in part in response to said detecting the change in altitude;

the altitude monitor unit further to detect a decent of an airplane based at least in part on said detecting the change in altitude; and a searcher unit, the power management unit to change said at least one power state by directing the searcher unit to recommence searching for terrestrial base stations at least in part in response to said detection of the decent of the airplane.

26. The mobile station of claim 25, the power management unit to change at least one power state by directing the mobile station to recommence an online communicate mode.

27. An apparatus, comprising:
means for detecting a change in altitude of a mobile station based, at least in part, on that a amount of change from signals provided by one or more sensors exceeds a specified threshold; and
means for changing at least one power state of the mobile station at least in part in response to said detecting the change in altitude.

28. The apparatus of claim 27, wherein said means for detecting the change in altitude comprises means for detecting a level of change of acceleration exceeding the specified threshold.

29. The apparatus of claim 27, wherein said means for detecting the change in altitude comprises means for detecting a level of change of acceleration exceeding the specified threshold over a specified period of time.

30. The apparatus of claim 27, wherein said means for detecting the change in altitude comprises means for detecting a change in atmospheric pressure exceeding the specified threshold.

31. The apparatus of claim 27, wherein said means for changing said at least one power state comprises means for directing a means for estimating a position to cease position location operations.

32. The apparatus of claim 27, wherein said means for changing said at least one power state comprises means for directing a means for wireless communication of the mobile station to enter a low-power state.

33. The apparatus of claim 27, wherein said means for changing at least one power state comprises means for directing the mobile station to enter an airplane mode of communication.

34. The apparatus of claim 27, further comprising means for detecting an ascent of an airplane based, at least in part, on information provided by said means for detecting the change in altitude.

35. The apparatus of claim 27, further comprising means for detecting a decent of an airplane based at least in part on information provided by said means for detecting the change in altitude.

36. An apparatus, comprising:
means for detecting a change in altitude of a mobile station based, at least in part, on signals provided by one or more sensor;
means for changing at least one power state of the mobile station at least in part in response to said detecting the change in altitude; and
means for detecting an ascent of an airplane based, at least in part, on information provided by said means for detecting the change in altitude,
wherein said means for changing said at least one power state comprises means for directing a searcher unit of the mobile station to cease searching for terrestrial base stations.

37. The apparatus of claim 36, further comprising means for enabling a modem to communicate with an air interface provided by the airplane at least in part in response to a detection of the ascent of the airplane.

38. An apparatus, comprising:
means for detecting a change in altitude of a mobile station based, at least in part, on signals provided by one or more sensor;
means for changing at least one power state of the mobile station at least in part in response to said detecting the change in altitude; and
means for detecting a decent of an airplane based at least in part on information provided by said means for detecting the change in altitude,
wherein said means for changing said at least one power state comprises means for directing a searcher unit of the mobile station to recommence searching for terrestrial base stations at least in part in response to said detection of the decent of the airplane.

39. The apparatus of claim 38, wherein said means for changing at least one power state comprises means for directing the mobile station to recommence an online communicate mode.

40. An article, comprising: a storage medium having stored thereon instructions that, if executed, enable a processor of a mobile station to:
detect a change in altitude of a mobile station based, at least in part, on an amount of change from one or more signals provided by one or more sensors of the mobile station exceeds a specified threshold; and
change at least one power state of the mobile station at least in part in response to said detecting the change in altitude.

41. The article of claim 40, wherein the storage medium has stored thereon further instructions that, if executed, further enable the processor to detect the change in altitude by detecting a level of change of acceleration exceeding the specified threshold.

42. The article of claim 40, wherein the storage medium has stored thereon further instructions that, if executed, further enable the processor to detect the change in altitude by detecting a level of change of acceleration exceeding the specified threshold over a specified period of time.

43. The article of claim 40, wherein the storage medium has stored thereon further instructions that, if executed, further enable the processor to detect the change in altitude by detecting a change in atmospheric pressure exceeding the specified threshold.

44. The article of claim 40, wherein the storage medium has stored thereon further instructions that, if executed, further enable the processor to change said at least one power state by directing a position estimation unit to cease position location operations.

45. The article of claim 40, wherein the storage medium has stored thereon further instructions that, if executed, further enable the processor to change said at least one power state by directing a modem of the mobile station to enter a low-power state.

46. The article of claim 40, wherein the storage medium has stored thereon further instructions that, if executed, further enable the processor to change at least one power state by directing the mobile station to enter an airplane mode of communication.

47. The article of claim 40, wherein the storage medium has stored thereon further instructions that, if executed, further enable the processor to detect an ascent of an airplane based, at least in part, on said detecting the change in altitude.

48. The article of claim 40, further comprising detecting a decent of an airplane based at least in part on said detecting the change in altitude.

49. An article, comprising: a storage medium having stored thereon instructions that, if executed, enable a processor of a mobile station to:
 detect a change in altitude of a mobile station based, at least in part, on one or more signals provided by one or more sensors of the mobile station; and
 change at least one power state of the mobile station at least in part in response to said detecting the change in altitude,
 wherein the storage medium has stored thereon further instructions that, if executed, further enable the processor to detect an ascent of an airplane based, at least in part, on said detecting the change in altitude, and
 wherein the storage medium has stored thereon further instructions that, if executed, further enable the processor to change said at least one power state by directing a searcher unit of the mobile station to cease searching for terrestrial base stations.

50. The article of claim 49, wherein the storage medium has stored thereon further instructions that, if executed, further enable the processor to enable a modem to communicate with an air interface provided by the airplane at least in part in response to a detection of the ascent of the airplane.

51. An article, comprising: a storage medium having stored thereon instructions that, if executed, enable a processor of a mobile station to:
 detect a change in altitude of a mobile station based, at least in part, on one or more signals provided by one or more sensors of the mobile station;
 change at least one power state of the mobile station at least in part in response to said detecting the change in altitude; and
 detecting a decent of an airplane based at least in part on said detecting the change in altitude,
 wherein the storage medium has stored thereon further instructions that, if executed, further direct the processor to change said at least one power state by directing a searcher unit of the mobile station to recommence searching for terrestrial base stations at least in part in response to said detecting the decent of the airplane.

52. The article of claim 51, wherein the storage medium has stored thereon further instructions that, if executed, further direct the processor to change at least one power state by directing the mobile station to recommence an online communicate mode.

53. A method, comprising:
 detecting an airplane landing event based, at least in part, on one or more signals provided by one or more sensors of a mobile station; and
 changing at least one power state of the mobile station at least in part in response to said detecting the airplane landing event,
 wherein said detecting the airplane landing event comprises matching a pattern of sensor data with a data pattern stored in an a priori database of landing patterns.

54. The method of claim 53, wherein said detecting the landing event comprises detecting a level of deceleration exceeding a specified threshold over a specified period of time.

55. The method of claim 53, wherein said detecting the airplane landing event comprises detecting a level of change in acceleration exceeding a specified threshold over a specified period of time.

56. The method of claim 53, wherein said one or more sensors comprises an accelerometer, and wherein said detecting the airplane landing event comprises performing spectral frequency analysis on accelerometer data.

57. The method of claim 53, wherein said one or more sensors comprises one or more of an accelerometer, a gyroscope, and a barometer.

58. A method, comprising:
 detecting an airplane takeoff event based, at least in part, on one or more signals provided by one or more sensors of a mobile station; and
 changing at least one power state of the mobile station at least in part in response to said detecting the airplane takeoff event,
 wherein said detecting the airplane takeoff event comprises matching a pattern of sensor data with a data pattern stored in an a priori database of takeoff patterns.

59. The method of claim 58, wherein said detecting the airplane takeoff event comprises detecting a level of change in acceleration exceeding a specified threshold over a specified period of time.

60. The method of claim 58, wherein said one or more sensors comprises an accelerometer, and wherein said detecting the airplane takeoff event comprises performing spectral frequency analysis on accelerometer data.

61. The method of claim 58, wherein said one or more sensors comprises one or more of an accelerometer, a gyroscope, and a barometer.

62. A method, comprising:
 detecting an airplane takeoff event based, at least in part, on one or more signals provided by one or more sensors of a mobile station; and
 changing at least one power state of the mobile station at least in part in response to said detecting the airplane takeoff event,
 wherein said one or more sensors comprises an accelerometer, and wherein said detecting the airplane takeoff event comprises performing spectral frequency analysis on accelerometer data, and
 wherein the airplane takeoff event is indicated by the accelerometer data if said spectral frequency analysis reveals low frequency, high acceleration peaks.

63. A mobile station, comprising:
 one or more sensors;
 an altitude monitor unit to detect an airplane landing event based, at least in part, on one or more signals provided by the one or more sensors of a mobile station; and
 a power management unit to change at least one power state of the mobile station at least in part in response to said detecting the airplane landing event,
 wherein said altitude monitor unit to detect the airplane landing event comprises a unit to match a pattern of sensor data with a data pattern stored in an a priori database of landing patterns.

64. A mobile station, comprising:
 means for detecting an airplane landing event based, at least in part, on one or more signals provided by one or more sensors of the mobile station; and
 means for changing at least one power state of the mobile station at least in part in response to said detecting the airplane landing event, wherein said means for detecting the airplane landing event comprises means for matching a pattern of sensor data with a data pattern stored in an a priori database of landing patterns.

65. A non-transitory computer-readable medium, comprising:
- at least one instruction for detecting an airplane landing event based, at least in part, on one or more signals provided by one or more sensors of a mobile station; and
- at least one instruction for changing at least one power state of the mobile station at least in part in response to said detecting the airplane landing event,
- wherein said at least one instruction for detecting the airplane landing event comprises at least one instruction for matching a pattern of sensor data with a data pattern stored in an a priori database of landing patterns.

66. A mobile station, comprising:
- one or more sensors;
- an altitude monitor unit to detect an airplane takeoff event based, at least in part, on the one or more signals provided by one or more sensors of the mobile station; and
- a power management unit to change at least one power state of the mobile station at least in part in response to said detecting the airplane takeoff event,
- wherein said altitude monitor unit to detect the airplane takeoff event comprises a unit to match a pattern of sensor data with a data pattern stored in an a priori database of takeoff patterns.

67. A mobile station, comprising:
- means for detecting an airplane takeoff event based, at least in part, on one or more signals provided by one or more sensors of the mobile station; and
- means for changing at least one power state of the mobile station at least in part in response to said detecting the airplane takeoff event,
- wherein said means for detecting the airplane takeoff event comprises means for matching a pattern of sensor data with a data pattern stored in an a priori database of takeoff patterns.

68. A non-transitory computer-readable medium, comprising:
- at least one instruction for detecting an airplane takeoff event based, at least in part, on one or more signals provided by one or more sensors of a mobile station; and
- at least one instruction for changing at least one power state of the mobile station at least in part in response to said detecting the airplane takeoff event,
- wherein said at least one instruction for detecting the airplane takeoff event comprises at least one instruction for matching a pattern of sensor data with a data pattern stored in an a priori database of takeoff patterns.

* * * * *